No. 775,780. Patented November 22, 1904.

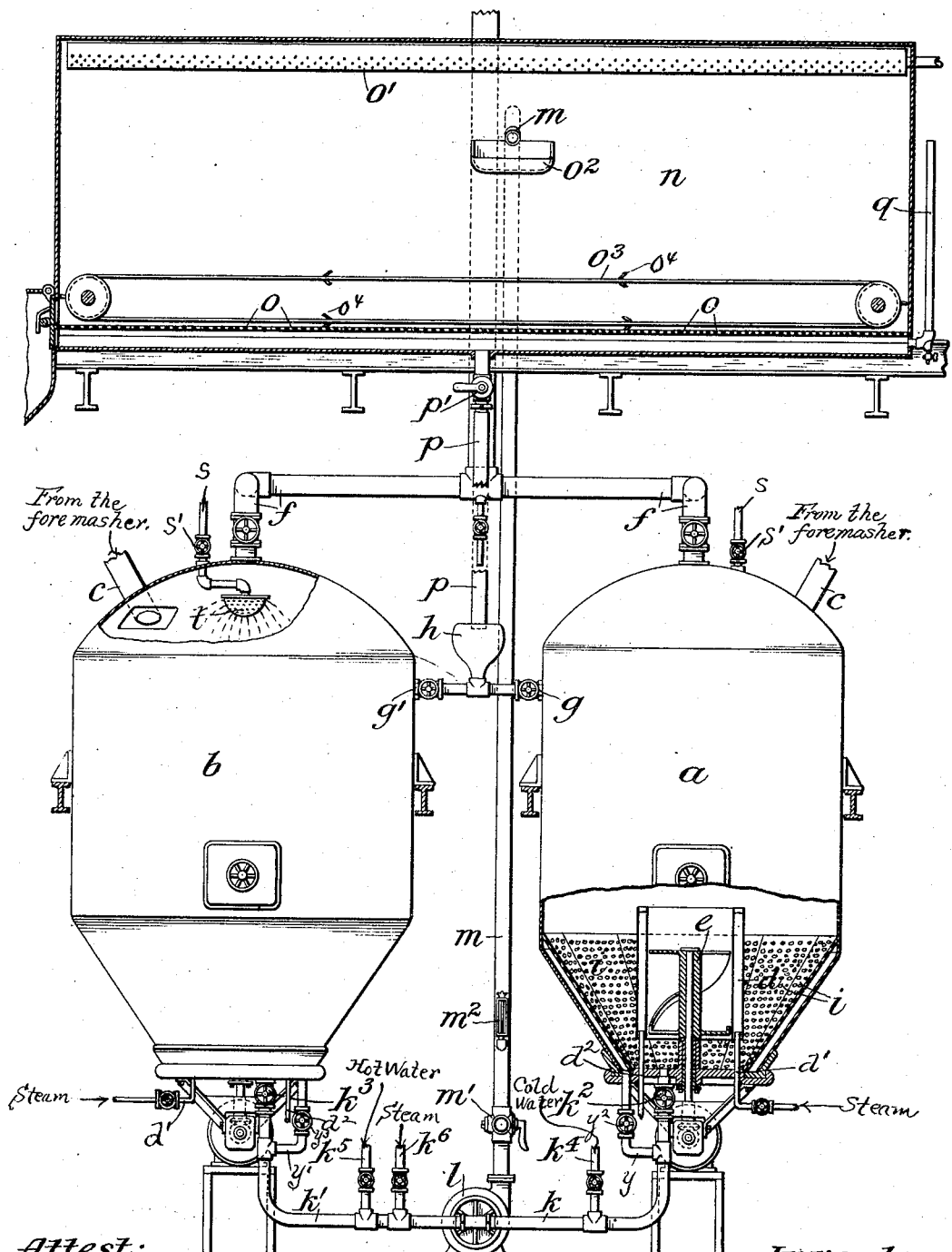

UNITED STATES PATENT OFFICE.

JOSEPH SCHNEIBLE, OF WEEHAWKEN, NEW JERSEY.

ART OF BREWING.

SPECIFICATION forming part of Letters Patent No. 775,780, dated November 22, 1904.

Application filed December 26, 1903. Serial No. 186,592. (No specimens.)

*To all whom it may concern:*

Be it known that I, JOSEPH SCHNEIBLE, a citizen of the United States, residing at Weehawken, in the county of Hudson, in the State of New Jersey, have invented certain new and useful Improvements in the Art of Brewing, of which the following is a specification, reference being had to the accompanying drawing, forming a part hereof.

This invention relates particularly to the preparation of beer-wort, and has for its object to make it possible to produce with certainty a wort of definite character, with reference particularly to the relationship between sugar and non-sugar, maltodextrins and dextrin, &c.

According to the methods of brewing now practiced the production of a wort of a definite or the best character in so far as it is dependent upon the relative amounts present in it of the different starch derivatives is practically impossible. This is largely due to the fact that the malt mash is subjected for a time long enough to permit conversion of the starch to take place to varying temperatures without so controlling the temperatures as to obtain the different starch derivatives in the desired proportions. This variation of temperature necessarily results from delivering, as is the customary practice, the cooked unmalted cereal mash or other heating medium, such as hot water, which in some systems of brewing is used to raise the temperature of the malt mash, at substantially the boiling temperature to the mash-tub, which already contains the peptonized malt mash, which is at a temperature much below the boiling-point. The stream of boiling-hot cooked mash raises the temperature of the adjacent portions of the malt mash to a heat approximating its own temperature, which unduly elevated temperature continues long enough for conversion of the starch to begin. Obviously where the hot cereal mash or other heating medium is thus introduced into the malt mash it is not only impossible to regulate the temperature to which portions of the malt mash are thus raised, but it is also impossible to regulate the quantity of the malt mash which has its temperature thus unduly raised, and the degree and extent of conversion or saccharification is therefore impossible of regulation under such methods.

According to the present invention the temperature of the peptonized malt mash is raised to the proper converting degree by the heat of the cooked unmalted cereal mash or other heating medium; but the attainment of the desired temperature is effected in so short a space of time that no reaction at other temperatures will take place, the contact of the malt mash at the peptonizing temperature with the substantially boiling-hot cooked mash or other heating medium being only momentary, or rather the thorough mixture of the two being so quickly effected that no undesired reaction takes place. The contact or mingling of the malt mash and cooked mash or other heating medium preferably takes place as the two mashes or the malt mash and heating medium are moving on together in a comparatively small stream, and no portion of the malt mash remains in contact for any appreciable length of time with the cooked mash or other heating medium while the latter is at boiling temperature. In other words, the malt mash is raised to the desired converting temperature without subjecting the malt mash to reaction at any temperature other than that which is predetermined.

It will be obvious that the invention can be practiced in different ways and with different forms of apparatus, the most convenient and practicable mode of practicing the invention being to thoroughly mingle the malt mash and the hot cooked mash or other heating medium while in movement from the respective tanks or sources of supply to the common mash-tub or strainer-tub, so that the desired converting temperature is attained at once in the commingled mashes or commingled malt mash and heating medium. After being so mingled the combined liquor is allowed to stand for the usual period of time required for conversion.

For the better understanding of the nature of the invention a suitable form of apparatus for the practice of the invention is represented in the accompanying drawing, in which such apparatus is shown partly in elevation and partly in vertical section.

In the form of apparatus shown in the drawing, $a$ represents the tank in which the cereal mash is cooked, and $b$ represents the tank in which the malt mash is peptonized, each tank being connected with a fore-mashing apparatus, the connection being indicated at $c$. Each tank is provided with a steam-drum $d$, the hollow walls of which are connected by a valve-controlled pipe $d'$ with a suitable steam-supply, an outlet being provided by pipe $d^2$. The tanks are each also provided with an inlet-pipe $s$, connected with a suitable water-supply and provided with a valve $s'$ and having at the end within the tank a sparging device $t$, through which water may be introduced to wash out the tanks or for other purposes. The tanks are each also provided with a mechanical device, such as $e$, for causing circulation of the mash in the tank, and a vapor-outlet $f$, all substantially as is usual in brewing apparatus. Since it is not only possible but desirable to employ the same tanks as brew-kettles as well as mash-tubs, each tank is provided with a wort-inlet, as at $g$ and $g'$, both inlets being connected to a common hopper or funnel $h$, and each tank is adapted to receive a strainer-bottom $i$, which is preferably formed in sections, so as to be inserted or removed through the manhole, with which each of the tanks is shown provided.

In the apparatus shown the tanks $a$ and $b$ are connected, respectively, by pipes $k$ and $k'$, controlled by valves $k^2$ and $k^3$, respectively, with the suction of a centrifugal pump $l$. The pipes $k$ and $k'$, as shown, lead directly from the bottoms of the tanks near their centers, and for the purpose of drawing off liquid from outside the strainers $i$ when these are in use branch pipes $y$ and $y'$, controlled, respectively, by valves $y^2$ and $y^3$, lead from a point near the outer edge of the bottoms of the tanks $a$ and $b$ to points in the pipes $k$ and $k'$ below the valves $k^2$ and $k^3$. The pipe $k$ is shown provided with a valve-controlled connection $k^4$, leading from a suitable cold-water supply, and the pipe $k'$ is shown provided with valved connections $k^5$ and $k^6$, leading, respectively, from a suitable hot-water and steam supply. The centrifugal pump $l$ may be of any ordinary or desired construction adapted to accomplish when the valves $k^2$ and $k^3$ are open an immediate and thorough mixture of the cooked mash from tank $a$ and the peptonized malt mash from the tank $b$ and to accomplish when the apparatus is arranged to supply hot water or other heating medium with the malt mash an immediate and thorough mixture of such heating medium with the malt mash. It is important that the mixture of the cooked mash or other heating medium employed and the malt mash be immediate and thorough, so that no portion of the malt mash shall be subjected during a period of time long enough to effect conversion to any temperature other than that which it is desired that the mixture shall have while it lies in the strainer-tub to permit conversion to proceed. By reason of this immediate and thorough mixing of the malt mash and the cooked mash or other heating medium the temperature of the malt mash is raised practically instantaneously from the peptonizing temperature to the temperature at which it is desired to have conversion take place—that is to say, that while the malt mash necessarily passes through the temperatures between the peptonizing temperature and the predetermined starch-converting temperature it passes through these intermediate temperatures so quickly that there is not sufficient time for conversion to take place.

It will be obvious that the thorough and immediate mixture of the two liquors is most completely, as well as most conveniently, effected while the liquors are in comparatively rapid movement through a suitable conductor, such as the discharge-pipe $m$ of the pump $l$, (equipped with a stop-valve $m'$ and thermometer $m^2$,) arranged to deliver the intimately-mixed liquors into the strainer-tank $n$, which is preferably located above the tanks $a$ and $b$ and in which the mixture is allowed to stand for such period of time as may be necessary to effect conversion. The tank $n$ is preferably constructed as a strainer-tub having a strainer-bottom $o$ and a delivery-pipe $p$, provided with a stop-cock $p'$ and arranged to deliver the liquor from the tank $n$ to the hopper or funnel $h$. The tank $n$ may be provided with a sparging device $o'$, a distributing device $o^2$, which receives the liquor from the end of the pipe $m$ and spreads it from its lip in a thin sheet or spray, a stirring device comprising a belt $o^3$, provided with ribs or wings $o^4$, by which the grains in the tank may be leveled and stirred and by which, the direction of movement of the belt and its ribs or wings being reversed, the grains may be swept toward the discharge-opening $o^5$ when it is desired to remove them from the tank. The tank is provided with one or more sight-glasses $q$, open at the top, so as to prevent the formation of a vacuum beneath the strainer-bottom of the tank.

In the practice of the invention with the apparatus above described a suitable quantity of water, preferably at a temperature of about 40° Réaumur, (122° Fahrenheit,) is run into the tank $a$, and a small quantity of the malt is run from the fore-mashing apparatus through connection $c$ into the same tank. The full quantity of rice or other cereal is then run into the tank $a$, steam is turned onto the drum $d$, the stirring device $e$ is set in operation, and the cooking is carried on until completed, at which time it will be substantially boiling hot. When the cooking of the cereal mash has been commenced, the proper quantity of malt is run into the tank $b$ from the fore masher through connections $c$, water at a temperature between 28° and 44° Réaumur (95° and 131° Fahrenheit) being admitted at the same time in such quantity as when mixed with the malt to give a mash of proper consistency in tank $b$, the mixing being effected by means of the stirrer with which the tank is provided, (not necessary to be shown, as it is identical with the stirrer $e$ of tank $a$.) During the preparation of the mashes in the tanks $a$ and $b$ the strainer-bottoms $i$ are of course out of the tanks.

When all the malt has been doughed into tank $b$ and the malt mash has been peptonized and the cereal mash in tank $a$ has been sufficiently cooked, the strainer-tank $n$ is made ready to receive the mixture of the two mashes by running hot water into it until the strainer-bottom is covered. The valves $k^2$ and $k^3$ of the pipes $k$ and $k'$ are then opened and the centrifugal pump $l$ started, the hot cooked cereal mash and the cooler peptonized malt mash being allowed to flow simultaneously to the suction of the pump, so that a thorough and immediate mixture of the two mashes shall be effected by the pump and the mixture forced onward through the pipe $m$ to the tank $n$. The thermometer $m^2$ shows the temperature of the mixture as it passes through the pipe $m$, and this temperature may be regulated by controlling the proportion of the hot cooked mash and the cooler malt mash admitted to the suction of the pump by means of the valves $k^2$ and $k^3$. The temperature may be further regulated by admitting cold water through the connection $k^4$ or by admitting hot water or steam through the connections $k^5$ or $k^6$, which may be used, if desired, to supply the heating medium, if a hot cooked cereal mash is not used. The temperature of the combined mash may thus be maintained at the precise degree at which it is desired that conversion or saccharification of the mash in tank $n$ shall take place.

When all the combined mash has been delivered to the tank $n$ and while conversion or saccharification is taking place, the tank $b$ is thoroughly cleaned, and the strainer-bottom (not necessary to be shown, as it is identical with the strainer-bottom $i$ of tank $a$) is put in place, thus preparing the tank to receive the wort and adapting it for use as a brew-kettle. As soon as the conversion of the malt in the tank $n$ is completed the valves at $p'$ and $g$ are opened, permitting the wort which has collected beneath the strainer-bottom $o$ in the tank $n$ to flow into the tank $a$, from which, the valve $k^2$ being opened and the valve $k^3$ being closed, the pump $l$ being started draws it from the tank $a$ and delivers it to the tank $n$ on top of the mash therein. The stand-glass $q$ during the removal of this portion of the wort from beneath the strainer-bottom acts to admit air, if necessary, to prevent the formation of a partial vacuum beneath the strainer-bottom. As soon as the wort becomes sufficiently brilliant, which may be observed at the funnel $h$, indicating that all of the doughy or other material which may have passed through the strainer-bottom $o$ has been removed, the valve $k^2$ is closed and the pump $l$ stopped. The valve $g'$ is then opened, the valve $g$ being closed, and the wort is permitted to accumulate in the tank $b$ until the tank is filled, when the valves $p'$ and $g'$ are closed and the wort is boiled and hopped in the usual manner. Meanwhile, the tank $a$ is cleaned and fitted with its strainer-bottom and the valves $p'$ and $g$ being opened, the remainder of the wort in the tank $n$ is allowed to run into the tank $a$, the extract being washed out of the grains of the mash by water at a suitable temperature admitted through the sparging device $o'$. The valves $p'$ and $g$ being closed, the wort thus run into the tank $a$ is boiled and hopped in the usual manner. When the wort in the tank $b$ is finished, it is drawn off to the fermenting-cellar and is followed by the wort from tank $a$ when finished. The tanks $a$ and $b$ are then washed out, the strainer-bottom $i$ being removed, and the apparatus is prepared for a repetition of the process as described.

The practice of the process as carried on in the apparatus shown in the drawing has been described in detail in order that the invention might be more clearly understood; but it will be obvious that the invention is not in any way limited to any particular form of apparatus or to any particular sequence of steps, provided the peptonized malt mash is brought to the desired converting temperature without permitting diastatic action at any intermediate or other temperature.

I claim as my invention—

1. The improvement in the art of brewing, which consists in raising the temperature of a peptonized malt mash instantaneously to a predetermined starch-converting temperature, whereby diastatic reaction at other temperatures while the temperature is being raised, is avoided.

2. The improvement in the art of brewing, which consists in instantaneously raising the temperature of a peptonized malt mash from a peptonizing temperature to a predetermined starch-converting temperature, and resting the mash until conversion of the starch takes place.

3. The improvement in the art of brewing, which consists in raising the temperature of a peptonized malt mash to a predetermined starch-converting temperature by effecting instantaneously a mixture with the peptonized mash of a heating medium of higher temperature, and resting the mixture until conversion of the starch has taken place.

4. The improvement in the art of brewing, which consists in raising the temperature of a peptonized malt mash to a predetermined starch-converting temperature by effecting instantaneously a mixture with the peptonized mash of a liquid medium of higher temperature, and resting the mixture until conversion of the starch has taken place.

5. The improvement in the art of brewing which consists in raising the temperature of a peptonized malt mash to a predetermined starch-converting temperature by effecting instantaneously a mixture with the peptonized mash of a cooked mash of higher temperature, and resting the mixture until conversion of the starch has taken place.

6. The improvement in the art of brewing, which consists in preparing a peptonized malt mash, preparing a cooked mash of higher temperature, so mixing the peptonized mash and cooked mash that they will be instantaneously brought to a predetermined starch-converting temperature, and resting the combined mash until conversion of the starch has taken place.

7. The improvement in the art of brewing, which consists in preparing a peptonized malt mash, preparing a heating medium of higher temperature, mixing the peptonized mash and heating medium in relatively small streams, so that they are instantaneously brought to a predetermined starch-converting temperature, and resting the mixture until conversion of the starch has taken place.

8. The improvement in the art of brewing, which consists in preparing a peptonized malt mash, preparing a cooked mash of higher temperature, mixing the mashes together in relatively small streams so that they are instantaneously brought to a predetermined starch-converting temperature, and resting the combined mash until conversion of the starch has taken place.

This specification signed and witnessed this 4th day of December, A. D. 1903.

JOSEPH SCHNEIBLE.

In presence of—
EDWARD ZAHN,
W. B. GREELEY.